3,020,236
MANGANESE-ZINC FERRITE AND METHOD OF MAKING

Alfred Sommers, Bergenfield, N.J., assignor to General Precision, Inc., a corporation of Delaware
No Drawing. Filed June 10, 1959, Ser. No. 819,226
2 Claims. (Cl. 252—62.5)

The present invention relates generally to a method of producing ferrites, and to ferrites of high magnetic permeability produced thereby. Particularly, the present invention is concerned with high permeability manganese ferrites, and mixed ferrites including a manganese ferrite.

Manganese ferrite ($MnFe_2O_4$) and mixed manganese ferrites, such as $MnFe_2O_4$:$ZnFe_2O_4$ and others, are well known in the art. Generally, these ferrites are recognized as possessing the properties of substantial magnetic permeability with high electrical impedance. The present invention is concerned with the production of manganese type ferrites, and particularly mixed manganese ferrites, with extremely high magnetic permeabilities ($\mu$) and very small values for the quotient $$\frac{\tan \delta}{\mu}$$

where $\tan \delta$ is the loss factor. For example, by the present process manganese type ferrites have been produced having a $\mu$ of approximately 3450 at room temperature, with a value for the quotient $$\frac{\tan \delta}{\mu}$$

lower than $10^{-5}$ and as low as $10^{-6}$ up to 100 kc., and Curie points of about 180° C.

Basically, these results are obtained by including in the ferrite producing mixture a quantity of manganous-manganic oxide ($Mn_3O_4$) as a portion of the manganese oxide constituent. In the case of mixed ferrites of the manganese type, represented by the formula $MnFe_2O_4$:$MeFe_2O_4$, where Me is a divalent conventional ferrite metal such as, for example, zinc or iron, the manganese is again provided at least in part by the inclusion of manganous-manganic oxide in the mix utilized to form the ferrites. Generally, these ferrites are produced by sintering under proper conditions mixtures of manganese dioxide ($MnO_2$), manganous-manganic oxide, and ferric oxide ($Fe_2O_3$), and further including a metal oxide (MeO) in the case of mixed ferrites. It is believed that the oxidation reduction cycles of the manganous-manganic oxide in the process of raising the temperature of the mix, as will be explained subsequently, affects the solid state reactions between the oxides to obtain a greater densification of the material, better diffusion of the metals to form a more homogeneous body, and more desirable grain growth. And it is believed that these effects are in large measure responsible for the great improvements obtained in magnetic permeability and loss factor quotient $$\frac{\tan \delta}{\mu}$$

derived in ferrites produced in accordance with the present invention.

Accordingly, one object of the present invention is to produce ferrites of high magnetic permeability and low magnetic loss.

Another object of the present invention is to provide high magnetic permeability, low magnetic loss, manganese type ferrites.

An additional object of the present invention is to provide high magnetic permeability, low magnetic loss mixed ferrites of the manganese type.

Still another object of the present invention is to provide a high magnetic permeability, low magnetic loss, zinc-manganese ferrite ($ZnFe_2O_4$:$MnFe_2O_4$).

In view of the foregoing it is understood that a basic aspect of the present invention is the incorporation of manganous-manganic oxide as a constituent in the mix used to make the ferrite. As mentioned, it is believed that the peculiar oxidation-reduction cycle of the $Mn_3O_4$ existing during the temperature rise of the mix in effecting the solid state reaction to produce the ferrite, is responsible for obtaining the greatly improved ferrite properties. Considering the reaction of $Mn_3O_4$ and $Fe_2O_3$ fired in air, the first phase occurs at about 600° C. when the $Mn_3O_4$ undergoes an oxidation to $Mn_2O_3$:

$$Mn_3O_4 + \tfrac{1}{4} O_2 \rightarrow 1.5 Mn_2O_3$$

At 950° C., the $Mn_2O_3$ reduces to $Mn_3O_4$:

$$1.5 Mn_2O_3 \rightarrow Mn_3O_4 + \tfrac{1}{4} O_2$$

At 1000° C. ferrite formation begins with reduction:

$$Mn_3O_4 + 3Fe_2O_3 \rightarrow 3MnFe_2 + \tfrac{1}{2} O_2$$

During the foregoing oxidation-reduction cycle, before the second phase starts (reduction at 950° C.), solid solutions between the $Fe_2O_3$ and $Mn_2O_3$ are observed. These solid solutions dissociate into $Mn_3O_4$ and $Fe_2O_3$ as a result of said second phase reduction, but it seems quite certain that the dissociated phases $Mn_3O_4$ and $Fe_2O_3$ still contain small amounts of Fe ions and Mn ions respectively. It is believed that this solution and dissociation in the phases of the $Mn_3O_4$ oxidation-reduction cycle has a beneficial effect on the rate of cation diffusion at the interfaces, facilitating homogeneity of the ultimate ferrite, and in addition, helping to break down the particle size of the constituents, and enabling the ferrite reaction to occur at lower temperatures of about 1150° C. rather than the normal 1250° C.

In view of these oxidation-reduction effects of manganous-manganic oxide, the atmosphere of the reaction mixture must be controlled. During the heating cycle, oxygen must be available for the oxidation reaction of the $Mn_3O_4$, and accordingly it is preferred that a mixture of nitrogen and oxygen be supplied as the reaction atmosphere during the period that the mixture is brought up to and held at sintering temperature. After the ferrite formation has been completed, no further solid state reaction should be permitted, in order to assure the presence of a single ferrite phase. Experimental results have shown that prevention of oxidation of the Mn ions after completion of the reaction is extremely important. Also decomposition at the surface of the product, caused either by oxidation or reduction, should be held to a minimum. Accordingly, the reaction product is cooled in an inert atmosphere, such as nitrogen. Surface decomposition results in an outer "skin," which is substantially paramagnetic and affects the overall magnetic properties of the product. If the formation of this skin is not completely prevented, it can be removed mechanically, such as by grinding, and such skin removal is found to improve the magnetic properties of the product greatly.

Since the formation of the ferrite body, core, or product is a sintering operation, the magnetic properties thereof are obviously a function of the density of, or percentage voids in, the product. Accordingly, the starting materials should be ground to extreme fineness, and preferably to a particle size of less than one micron.

Thus, the generalized process of producing the novel ferrite in accordance with the present invention comprises reacting a ferrite forming mixture in the solid state to produce a sintered ferrite body. This reaction mixture includes as its essential ingredients $Fe_2O_3$ and $Mn_3O_4$, together with a ferrite forming metal oxide, or a mixture of ferrite forming metal oxides, such for example as ZnO and MnO$_2$. The reaction mixture is brought up to ferrite forming and sintering temperature (about 1300° C.) under a partial oxygen atmosphere and held at this temperature until the ferrite forming reaction and sintering is complete. The ferrite product is then cooled under an inert atmosphere. Preferably, any surface decomposition formed on the surface of the product during the cooling step of the process is then removed, as by grinding or the like.

The following is a specific example of the foregoing process and the ferrite product produced thereby:

*Example*

A mixture of chemically pure zinc oxide (ZnO), manganese dioxide (MnO$_2$), manganous-manganic oxide (Mn$_3$O$_4$), and ferric oxide (Fe$_2$O$_3$) in a mol ratio of 18:25:5:52, on a 100 percent purity basis, is ground for 4-6 hours in a steel jar mill. The mixture is dried and broken up to pass a 40 mesh screen. This blended material is then calcined at 1000° C. to 1060° C. The calcined material is reground in a steel jar mill for another 24-48 hours until a particle size of no greater than one micron is obtained. In the entire milling procedure distilled water is used in order to keep the alkali impurity content as low as possible. After drying, the mixture is molded with a binder such as a wax binder, into its final shape. These pieces are sintered for 2-4 hours at a temperature of 1300° C. to 1350° C. in an electric furnace in an atmosphere of air and nitrogen. At the start of the sintering period, the oxygen content of the atmosphere is about 24%, this oxygen content being slowly reduced, so that upon cooling it reaches an oxygen content of ½ of 1 percent. The furnace is then turned off and the product is allowed to cool in a nitrogen atmosphere. The resultant manganese zinc ferrite had an initial permeability of about 2850 measured at room temperature, and a Curie point of 180° C. Surface decomposition of the product was removed by grinding off about 0.05 to 0.10 inch from the entire surface. This brought the permeability up to about 3450, while retaining the Curie point.

In the above example the mol ratio can be varied by varying the proportions of MnO$_2$ and Mn$_3$O$_4$ employed, the range of mol ratios being:

| | Percent |
|---|---|
| Fe$_2$O$_3$ | 52 |
| MnO$_2$ | 15-25 |
| Mn$_3$O$_4$ | 5-15 |
| ZnO | 18 |
| Total | 100 |

By way of comparison, to illustrate the improved results obtained by the present invention, the procedure of the foregoing example was carried out with two conventional ferrite producing mixes. One such mix was ferric oxide (Fe$_2$O$_3$), manganese dioxide (MnO$_2$), and zinc oxide (ZnO), in the mol ratio of 52:30:18, and the resultant ferrite had a magnetic permeability of only about 915. The second mix was ferric oxide (Fe$_2$O$_3$), manganese carbonate (MnCO$_3$), and zinc oxide (ZnO), in the mol ratio of 52:30:18, and the resultant ferrite had a magnetic permeability of only about 250. Thus, the presence of the manganous-manganic oxide had a very substantial effect on the permeability of the resultant ferrite. This may be due to the oxidation-reduction cycle explained above, but I do not intend that this theory be binding upon me. The fact is that by practising the teachings of the present invention, greatly increased magnetic permeability is obtained.

Having thus described the present invention and presented an exemplary specific example thereof, variations and modifications of the specific example will be apparent to those skilled in the art, and such as are embraced within the spirit and scope of the appended claims are contemplated as within the purview of the present invention.

I claim:

1. A method of preparing a manganese-zinc ferrite with high magnetic permeability, small loss factor and a Curie point of about 180° C., comprising the steps of milling a calcined mixture of a particle size of no greater than 1 micron consisting essentially in mol percentage of about 52% Fe$_2$O$_3$, between about 15% to about 25% MnO$_2$, between about 5% to about 15% Mn$_3$O$_4$, and about 18% ZnO, for a time period of between 24 to 48 hours utilizing only distilled water during the milling operation to keep the alkali impurity content as low as possible;

drying the mixture;

molding the mixture with a binder into desired shapes;

sintering the mixture for between about 2 to about 4 hours at a temperature of between about 1300° C. to about 1350° C. in an atmosphere of about 24% oxygen and the balance substantially nitrogen;

slowly reducing said oxygen content so that at the end the oxygen content is about ½ of 1%; and, slowly cooling said sintered product in a nitrogen atmosphere.

2. A method as defined in claim 1, including the step of grinding the surface of the finished product about 0.05 to about 0.10 inch to remove surface decomposition.

References Cited in the file of this patent

UNITED STATES PATENTS

| 2,549,089 | Hegyi | Apr. 17, 1951 |
| 2,764,552 | Buckley et al. | Sept. 25, 1956 |

FOREIGN PATENTS

| 164,420 | Austria | Nov. 10, 1949 |
| 218,164 | Australia | Oct. 28, 1958 |
| 552,377 | Canada | Jan. 28, 1958 |
| 1,120,702 | France | Apr. 23, 1956 |
| 1,128,416 | France | Aug. 27, 1958 |

OTHER REFERENCES

Stoller: RCA Technical Notes No. 92, 1 page pub. by RCA Lab., Princeton, N.J. (record Dec. 2, 1957).

Gorter: Proceedings of the IRE, December 1955, p. 1960.